United States Patent [19]
Stahl

[11] 3,826,091
[45] July 30, 1974

[54] PROCESS FOR CONVERTING HEAT PRODUCED BY A NUCLEAR REACTOR TO ELECTRICAL ENERGY

[75] Inventor: William F. Stahl, Media, Pa.

[73] Assignee: Westinghouse Electric Corporation, Philadelphia, Pa.

[22] Filed: May 24, 1971

[21] Appl. No.: 146,239

[52] U.S. Cl. .................................................. 60/644
[51] Int. Cl. ............................................. F01k 25/00
[58] Field of Search .................. 60/38, 36, 59 T, 49

[56] References Cited
UNITED STATES PATENTS

| | | | |
|---|---|---|---|
| 1,519,353 | 12/1924 | Bowen et al. | 60/38 |
| 2,593,963 | 4/1952 | Biggs | 60/38 |
| 3,218,802 | 11/1965 | Sawle | 60/36 |
| 3,266,246 | 8/1966 | Heller et al. | 60/38 |
| 3,324,652 | 6/1967 | Maillet | 60/36 |
| 3,503,204 | 3/1970 | Suter | 60/36 |
| 3,699,681 | 10/1972 | Frutschi | 60/59 T |

Primary Examiner—Martin P. Schwadron
Assistant Examiner—Allen M. Ostrager
Attorney, Agent, or Firm—F. J. Baehr, Jr.

[57] ABSTRACT

A thermodynamic process for converting heat produced by a nuclear reactor to electrical energy utilizing a liquid metal as a primary fluid and sulfur dioxide as a secondary fluid. The sulfur dioxide is expanded in a turbo-generator set, condensed and recycled through a closed secondary fluid loop.

6 Claims, 2 Drawing Figures

PROCESS FOR CONVERTING HEAT PRODUCED BY A NUCLEAR REACTOR TO ELECTRICAL ENERGY

BACKGROUND OF THE INVENTION

This invention relates to a process or cycle for converting heat energy to electrical energy, and more particularly to a process or cycle for converting the heat energy produced by a nuclear reactor to electrical energy using a thermodynamic process or cycle in which a liquid metal is a primary fluid and the secondary fluid is a fluid other than water.

The demand for electrical power in the United States doubles approximately every 10 years. Presently, fossile fuel provides a majority of the heat energy for producing the needed electrical power. In the next thirty years it is estimated that over 50 percent of our electrical power will be produced by nuclear energy. The supply of fissionable material is limited, so that the future of nuclear power generation depends on developing a fast breeder reactor, which produces more fissionable material than it consumes.

To remove heat from the core of such a reactor a heat transfer medium which has a high specific gravity and can be maintained at high temperatures, in excess of 1,000° at low pressures is required. Metals like sodium or potassium possess these properties, however, they react violently with water, which is the most common fluid used in thermodynamic cycles for converting heat energy to electrical energy. Mercury has been suggested but it is extremely expensive and has a very high boiling point.

A cycle utilizing $CO_2$ was discussed in an article by G. Angelino entitled "Perspectives for The Liquid Phase Compression Gas Turbine," which appeared in the April 1967 issue of the Journal of Engineering for Power of the ASME. Carbon dioxide has a critical temperature below 90° F; thus it would be difficult to provide a satisfactory supply of cooling water in many parts of the United States in the summer months. Therefore, it is undesirable to use carbon dioxide as the secondary fluid in a liquid metal nuclear reactor cycle.

Cycles utilizing fluorocarbon turbines have been built in Japan, see Overseas Survey, January 1971 issue of Mechanical Engineering; however, fluorocarbons are not stable at temperatures in excess of 1,000°. Thus, they are only suitable for cycles utilizing a low temperature heat source and not suitable for cycles utilizing a liquid metal such as molten sodium as the source of heat.

Since the liquid metal comes in close proximity to the core of the reactor, it is subjected to a high density of high speed particles which make it radioactive so that by developing a thermodynamic cycle utilizing a material which will not react violently with sodium, the secondary fluid may come in direct contact with the radioactive sodium and there is no need for a secondary sodium loop which is considered essential in a sodium water cycle.

SUMMARY OF THE INVENTION

In general, this invention describes the steps of a thermodynamic process or cycle for converting the heat produced by a nuclear reactor to electrical energy wherein the process comprises the following steps: transferring heat from the reactor to a liquid metal; transferring heat from the liquid metal to a secondary fluid having a boiling point less than 200° F at atmospheric pressure and a critical temperature over 90° F; the secondary fluid is so composed as not to react violently with the liquid metal and is stable at elevated temperatures; expanding the secondary fluid in a turbogenerator set to convert heat energy into electrical energy and recycling the fluids in separate, generally closed fluid loops.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
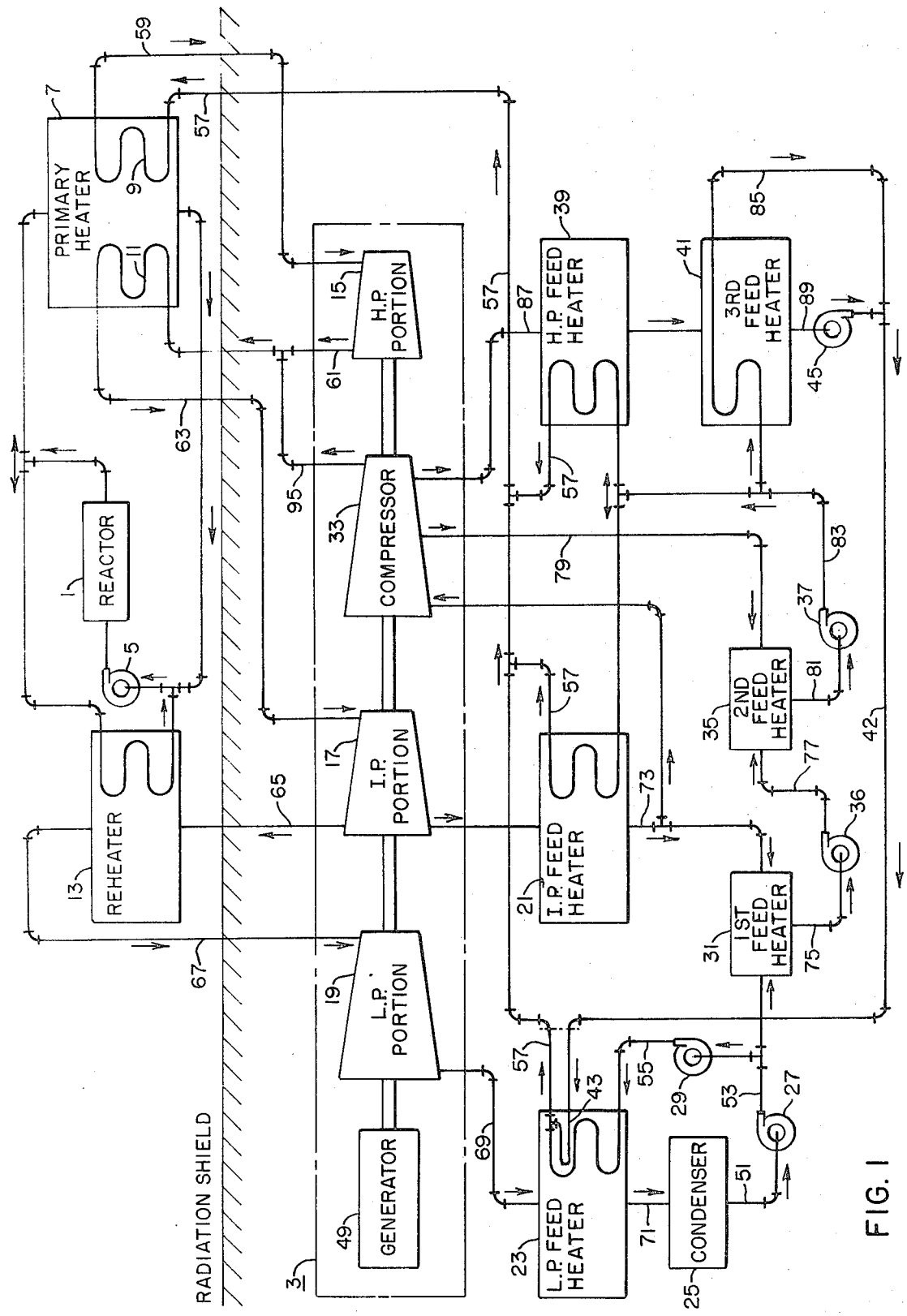
FIG. 1 is a flow diagram for a nuclear power plant utilizing the process disclosed by this invention.

Referring now to the drawings in detail, FIG. 1 shows a flow diagram for converting heat energy produced by a nuclear reactor 1 to electrical energy produced by a turbogenerator set 3. As shown in FIG. 1, a liquid metal pump 5 propels or pumps a primary fluid, a liquid metal preferably sodium, potassium or a mixture of sodium and potassium, through the reactor 1 to remove heat therefrom and through a primary heat exchanger 7 having a high pressure portion 9 through which secondary fluid above its supercritical pressure is pumped and a reheat portion 11 through which partially expanded secondary fluid is reheated. The primary fluid is also pumped through a second reheater 13, which provides a second stage of reheat for the secondary fluid. Secondary fluid utilized in this process or cycle should have a boiling point of less than 200° F at atmospheric pressure, a critical temperature above 90° F, should not react violently with liquid metals such as sodium or potassium and be stable at elevated temperatures, generally above 1,000° F. Such elements and compounds include sulfur dioxide and ammonia.

The secondary fluid, in this embodiment sulfur dioxide, is pumped to the high pressure portion 9 of the primary heat exchanger 7 at a pressure above its supercritical pressure; thus the second fluid does not change state in the primary heat exchanger. Compounds and elements having boiling points lower than 200° F generally have critical pressures generally below 1,700 pounds per square inch compared to a critical pressure above 3,000 pounds per square inch for water. So that utilizing a fluid such as sulfur dioxide having a boiling point below 200° F eliminates many of the problems associated with supercritical water cycles and its associated high pressures. After passing through the primary heat exchanger 7 the secondary fluid is expanded in a high pressure portion 15 of the turbogenerator set 3. The partially expanded secondary fluid then passes to the reheater portion 11 of the primary heat exchanger 7, wherein its temperature is increased before it is expanded in an intermediate pressure portion 17 o the turbogenerator 3. The flow of the secondary fluid leaving the intermediate pressure portion 17 of the turbogenerator 3 is split; a portion of the secondary fluid passes through the second reheater 13 and is then expanded in the low pressure portion 19 of the turbogenerator 3. The other portion of the secondary fluid is bled to an intermediate pressure regenerative feed heater 21.

After being completely expanded in the low pressure portion 19 of the turbogenerator 3 the secondary fluid passes through a low pressure regenerative feed heater 23, which preheats a portion of the feed fluid on its way to the high pressure portion 9 of the primary heat exchanger 7. From the low pressure regenerative feed heater 23, fully expanded secondary fluid flows into a condenser 25, wherein it is condensed from gas to a liquid by cooling water circulating through the condenser. Since the secondary fluid has a boiling point below 200° at atmospheric pressure and a critical temperature above 90° F it can be condensed utilizing cooling water which exceeds 80° F, making the system suitable for any portion of the United States even in the summer months.

The condensed secondary fluid is pumped or propelled from the condenser 25 by a condensate pump 27. A portion of the condensed secondary fluid is pumped from the condensate pump 27 to a feed pump 29, through the low pressure regenerative feed heater 23 and to the high pressure portion 9 of the primary heat exchanger 7.

A portion of the condensate from the condensate pump 27 is pumped to a first feed direct contact heater 31, wherein it mixes with and condenses fluid from the intermediate pressure regenerative feed heater 21. The intermediate pressure regenerative feed heater as noted hereinbefore, receives a portion of the secondary fluid after it has been expanded in the intermediate pressure portion 17 of the turbogenerator 3. The effluent fluid from the intermediate pressure regenerative feed heater 21 splits, a portion flows to the first feed heater 31 and another portion flows to a compressor 33, directly connected to the turbogenerator set. The discharge from the compressor joins the exhaust from the high pressure portion 15 of the turbogenerator 3 and flows to the reheater portion 11 of the primary heat exchanger 7. Secondary fluid is bled from two stages of the compressor 33, as will be described hereinafter. Thus, a gas compression stage is added to this cycle or process to increase its efficiency.

The heated condensate from the first feed heater 31 is pumped to a second direct contact feed heater 35 by a first heater condensate pump 36. The condensate heated in the first heater 31 is mixed with and condenses the bleed from the lower of the two stages of fluid bled from the compressor 33 in the second feed heater 35.

Condensate heated in the second feed heater 35 is picked up by a second heater feed pump 37. The flow of secondary fluid from the second heater feed pump 37 follows three separate flow paths. A first portion of the secondary fluid from the second feed heater 35 flows through the intermediate regenerative feed heater 21 and then to the high pressure portion 9 of the primary heat exchanger 7. A second portion of the secondary fluid from the second feed heater 35 flows through a high pressure regenerative feed heater 39 and then to the high pressure portion 9 of the primary heat exchanger 7.

Secondary fluid from the high pressure bleed stage of the compressor 33 supplies heat to the high pressure regenerative heat exchanger 39.

The third portion of the fluid from the second feed heater flows through a third feed heater 41, through a conduit 42, then through a coil portion 43 of the low pressure regenerative feed heater 23 and then to the high pressure portion 9 of the primary heat exchanger 7.

Condensate from the third feed heater 41 is picked up by a third heater discharge feed pump 45 and pumped into the conduit 42, commingles with other fluid that has passed through the feed heater 41 and continues on the same course. It passes through the coil portion 43 of the low pressure regenerative feed heater 23 and then to the high pressure portion 9 of the primary heat exchanger 7.

The turbogenerator unit 3 is shown with a single shaft having the compressor 33 and a generator 49 directly connected to the turbine units 15, 17 and 19, but it is understood that any arrangement may be used to drive the compressor including a separate drive.

Figure 2:
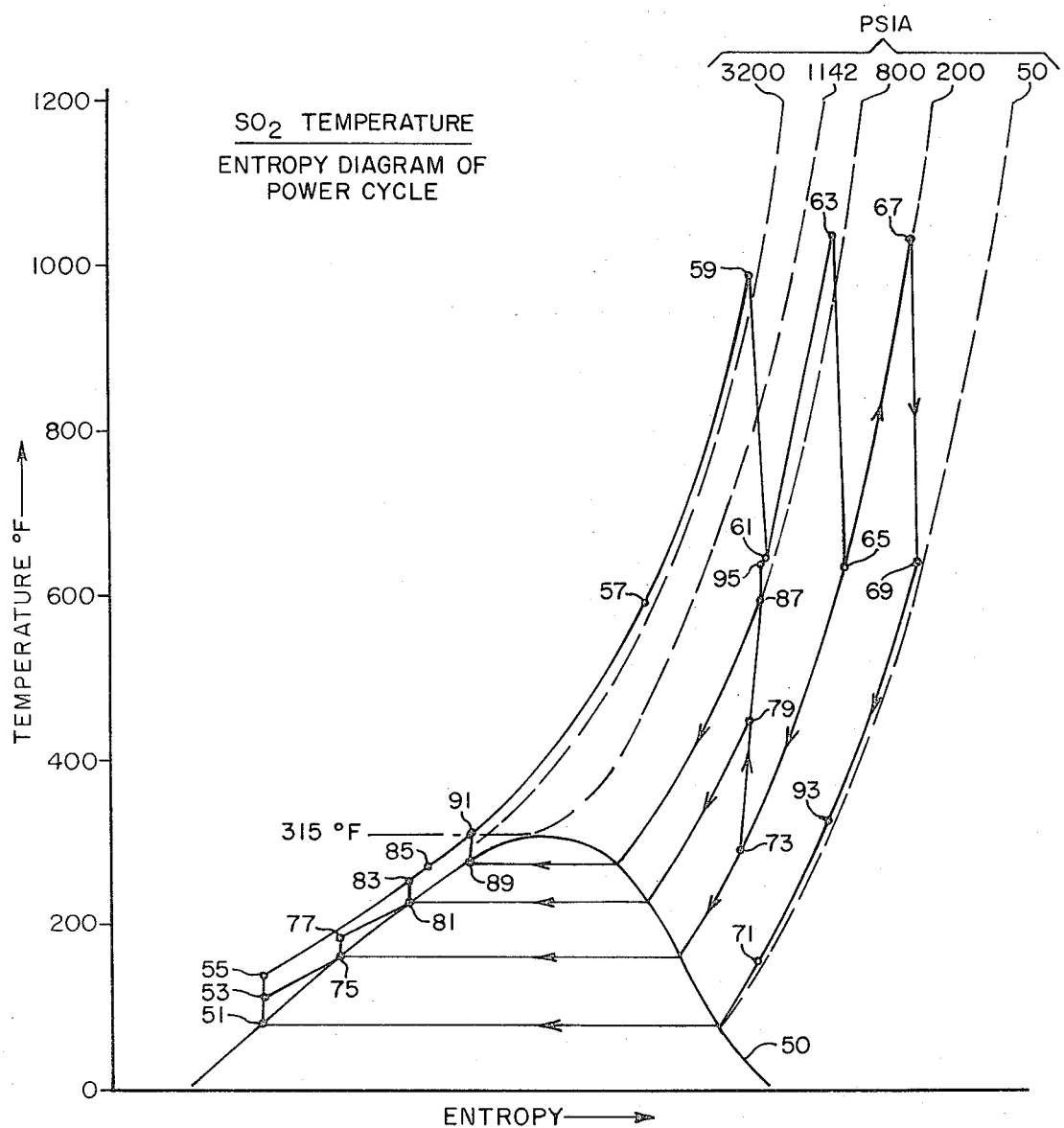
FIG. 2 is a temperature entropy diagram showing the temperature and entropy of the secondary fluid at various locations in the flow diagram shown in FIG. 1.

FIG. 2 shows a temperature entropy diagram for the process or cycle shown in FIG. 1 utilizing $SO_2$ as the secondary fluid. The characters in FIG. 2 represent the temperature, pressure and entropy of the second fluid at corresponding positions in the flow diagram shown in FIG. 1. Line 50 represents the saturated vapor line and the family of dotted lines, which curve upwardly, represent the pressure indicated adjacent thereto.

Secondary fluid, in this case sulfur dioxide, leaving the condenser 25 has the lowest temperature and entropy as indicated at 51. After passing through the condensate pump 27 the pressure of the secondary fluid is increased to above its critical pressure, 1,142 psi, and its temperature is increased a slight amount as indicated at 53. A portion of the primary fluid passes through the feed pump 29 increasing the entropy of the pressurized fluid as indicated at 55. After passing through the low pressure regenerative feed heater the temperature and entropy are increased to the degree indicated at 57. Secondary fluid supplied from several other portions of the cycle or process, as will be described hereinafter, also have the same temperature and entropy before flowing to the high pressure portion of the primary heat exchanger 7, where its temperature and entropy are increased to the value as indicated at 59. After being expanded from above 3,200 psi to above 800 psi in the high pressure portion 15 of the turbine the secondary fluid undergoes a slight increase in entropy and the temperature is reduced considerably as indicated at 61. Reheating the secondary fluid as it passes through the reheat portion 11 of the primary heat exchanger 7 increases the temperature and entropy to the degree indicated at 63 while the pressure remains essentially constant. Expanding the secondary fluid through the intermediate pressure portion 17 slightly increases its entropy, reduces the pressure from above 800 psi to approximately 200 psi and reduces the temperature to approximately 650° F as indicated at 65. A portion of the secondary fluid which has been expanded in the intermediate pressure turbine 17 is reheated at essentially constant pressure to increase the temperature and entropy to the degree indicated at 67. The secondary fluid is then expanded from 200 psi to approximately 50 psi in the low pressure portion 19 of the turbine producing a slight increase in entropy and a reduction in temperature as indicated at 69. The exhaust from the low pressure portion 19 of the turbine passes through the low pressure regnerative feed heater 23 where its temperature and entropy are reduced to a value indicated at 71 and in the condenser the primary fluid is cooled and condensed by circulating water so that the value of its temperature and entropy is reduced to the degree indicated at 51.

A portion of the secondary fluid leaving the condensate pump 27 flows into the first direct contact feed heater 31 and mixes with secondary fluid which has been expanded in the intermediate portion 17 of the turbogenerator 3 and has passed through the intermediate regenerative feed heater 21 and has had its temperature and entropy reduced to the degree indicated at 73 by transferring heat to a portion of the feed passing through the intermediate pressure regenerative feed heater 21.

Secondary fluid from the intermediate pressure regenerative feed heater 21 and from the condenser 25 mix in the first direct contact feed heater 31 to produce secondary fluid having a temperature and entropy indicated at 75. The first feed condensate pump increases the pressure and temperature to the value indicated at 77.

In the second direct contact feed heater 35 secondary fluid from the lowest pressure bleed stage of the compressor 33 having a temperature and entropy indicated at 79 is mixed with the discharge of the first heater condensate pump 36 to provide a effluent from the second direct contact heater 35 having a temperature and entropy indicated at 81. The effluent from the second direct contact feed heater passes through the feed pump 37 increasing the pressure and temperature of the secondary fluid to the degree indicated at 83.

The discharge from the feed pump 37 is divided into three portions, one portion flows through the third feed heater 41 and has its temperature and entropy increased to a level indicated at 85. A second portion of the discharge from the feed pump 37 flows through the high pressure regenerative feed heater 39 and has its temperature and entropy increased to the degree indicated at 57. A third portion of the discharge of the feed pump 37 flows through the intermediate pressure regenerative feed heater 21 and increases the temperature and entropy of that portion of the secondary fluid to the degree indicated at 57.

A high pressure bleed from the compressor 33 delivers secondary fluid having a temperature and entropy level indicated at 87 to the high pressure regenerative feed heater 39 and to the third feed heater 41 associated therewith. The secondary fluid condensed in these heaters has its temperature and entropy reduced to the level indicated at 89. The third heater feed pump 45 increases the pressure and temperature of the condensate from these heaters to the level indicated at 91 and the temperature and entropy are increased to the level indicated at 57 as this portion of the secondary fluid picks up heat in the coil portion 43 of the low pressure regenerative feed heater 23.

The specific heat of the supercritical pressurized $SO_2$ as indicated between 91 and 57 is greater than the specific heat of the exhaust indicated between 69 and 93, which is above the critical temperature; thus, causing an undesirable degradation in the heat energy for feed heating. To increase or augment the energy available for feed heating at temperatures near and above the critical temperature, a compression loop was added to the cycle or process so that the energy level of the secondary fluid can be raised from a level indicated at 73 to a level indicated at 95. The energy level at 95 is approximately equal to the energy level of the fluid at 61 so that the flow stream of the secondary fluid from the herebefore mentioned sources may be joined before the fluid enters the reheater portion 11 of the primary heat exchanger 7. By properly choosing the amount of fluid flowing through the compressor it is possible to balance the energy and temperatures of the feed heaters and the exhausted fluid.

Preliminary heat balances on such a cycle indicate a thermal efficiency in the order of 50 percent, for a process as herebefore described, sized t produce about 2,000 megawatts on a single shaft.

$SO_2$ is the preferred secondary fluid as it provides for relatively small turbine exhaust size, compared to a turbine utilizing a water cycle, coupled with a reasonably high critical temperature, 315° F which allows a reasonable amount of feed heating by condensing the secondary fluid. $SO_2$ also reacts with sodium to form $Na_2S$ which melts at 2,156° F and $Na_2O$ which sublimes at 2,327° F, the reaction is not extremely exothermic, so that a large amount of heat is not released as in the reaction between sodium and water.

What is claimed is:

1. A thermodynamic process for converting heat produced by a nuclear reactor to a more useful form of energy utilizing a plurality of turbines and a compressor, said process comprising the following steps:
    transferring heat produced in said reactor to a liquid metal;
    transferring heat from said liquid metal to a secondary fluid which does not react violently with the liquid metal when the secondary fluid comes in direct contact with the liquid metal;
    expanding said heated secondary fluid in a first turbine;
    reheating the secondary fluid exhausted from the first turbine;
    expanding the reheated secondary fluid in a second turbine;
    splitting the exhaust from said second turbine;
    expanding a first portion of said split exhaust from said second turbine in a third turbine;
    compressing a second portion of said split exhaust from said second turbine; and
    uniting at least a portion of the recompressed secondary fluid with the exhaust from said first turbine prior to said exhaust being reheated, thereby producing an efficient thermodynamic process.

2. A process as set forth in claim 1 and further comprising the step of reheating the first portion of said split exhaust from the second turbine prior to expanding said first portion of said split exhaust in said third turbine.

3. A process as set forth in claim 2 and further comprising the step of bleeding secondary fluid from one stage of said compressor to provide heating fluid for a feed heater.

4. A process as set forth in claim 3 and further comprising the step of bleeding said secondary fluid from a second stage of said compressor to provide heating fluid for a second feed heater.

5. A process as set forth in claim 1 and further comprising the step of bleeding secondary fluid from one stage of said compressor to provide heating fluid for a feed heater.

6. A process as set forth in claim 5 and further comprising the step of bleeding secondary fluid from a second stage of said compressor to provide heating fluid for a second feed heater.

* * * * *